United States Patent [19]

Wille

[11] Patent Number: 5,941,480
[45] Date of Patent: Aug. 24, 1999

[54] HINGE LINE SKIN SYSTEM FOR AN AIRCRAFT

[75] Inventor: Robert Henry Wille, St. Charles, Mo.

[73] Assignee: McDonnell Douglas

[21] Appl. No.: 08/852,870

[22] Filed: May 8, 1997

[51] Int. Cl.⁶ .................................. B64C 1/06; B64C 3/58
[52] U.S. Cl. ........................ 244/131; 244/123; 244/133; 244/213; 244/219
[58] Field of Search ..................... 244/213, 214, 244/215, 219, 123, 130, 131, 132, 133; 442/104, 105, 306, 318

[56] References Cited

U.S. PATENT DOCUMENTS

| | | |
|---|---|---|
| 1,460,053 | 6/1923 | Cleghorn ............................ 442/104 X |
| 1,590,783 | 6/1926 | Tesse .................................. 442/104 X |
| 2,368,702 | 2/1945 | Bourne ..................................... 244/130 |
| 4,429,844 | 2/1984 | Brown et al. .......................... 244/219 |
| 4,761,324 | 8/1988 | Rautenberg et al. . |
| 5,222,699 | 6/1993 | Albach et al. .......................... 244/213 |
| 5,385,774 | 1/1995 | Cramer et al. ..................... 442/318 X |
| 5,794,893 | 8/1998 | Diller et al. ......................... 244/130 X |

*Primary Examiner*—Charles T. Jordan
*Assistant Examiner*—Theresa M. Wesson
*Attorney, Agent, or Firm*—Dale B. Halling

[57] ABSTRACT

A hinge line system (52) for an aircraft has a structural block (22) attached to a first edge of a hinge line. The structural block (22) has a flange (28) attached to a first end of an elastic sheet (32). A second structural block (24) is attached to a second edge of the hinge line. The second structural block (24) has a second flange (30) attached to a second end of the elastic sheet (32).

15 Claims, 2 Drawing Sheets

HINGE LINE SKIN SYSTEM FOR AN AIRCRAFT

FIELD OF THE INVENTION

The present invention relates generally to aircraft and more particularly to a hinge line skin system for an aircraft.

BACKGROUND OF THE INVENTION

All aircraft employ control devices on the wings, tails or fuselages. These control devices include ailerons, leading edge flaps, rudders and elevators to name a few. All these control devices have hinge lines, that if not aerodynamically sealed result in aerodynamic spillage. Aerodynamic spillage occurs when air passes from the high pressure side of a control surface to the low pressure side. Typically this occurs along the hinge line of the control surface. Aerodynamic spillage results in a less efficient control device. Other door hinges, such as those used for avionics bays, also result in aerodynamic drag that reduces the aircraft's performance.

Thus there exists a need for a hinge line seal for control surfaces of an aircraft and other hinged doors that eliminates (or reduces) aerodynamic spillage and is lightweight.

SUMMARY OF THE INVENTION

A hinge line system for an aircraft that overcomes these and other problems has a structural block attached to a first edge of a hinge line. The structural block has a flange attached to a first end of an elastic sheet. A second structural block is attached to a second edge of the hinge line. The second structural block has a second flange attached to a second end of the elastic sheet.

DETAILED DESCRIPTION OF THE DRAWINGS

Figure 1:
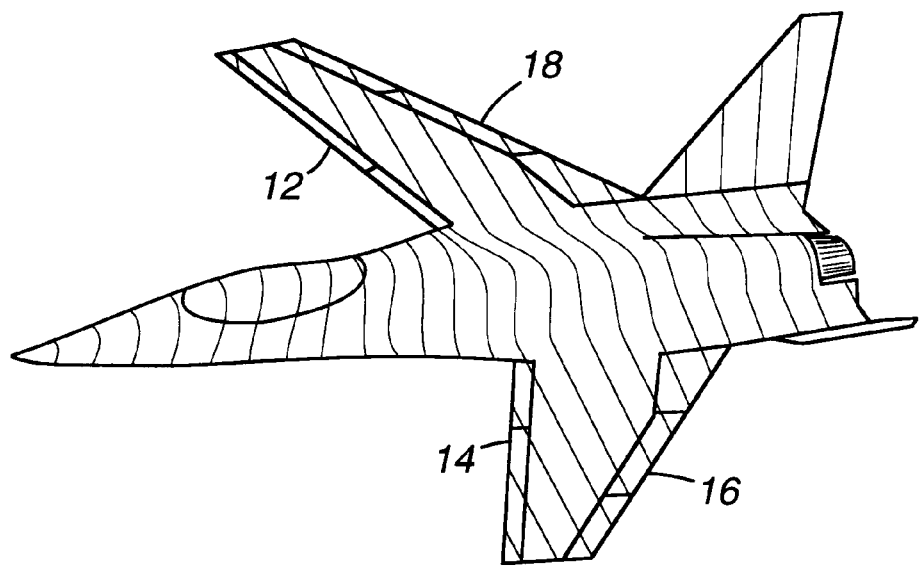
FIG. 1 is a perspective view of an aircraft.

FIG. 1 is a perspective view of an aircraft 10. The aircraft has a number of control surfaces 12–18 that have hinge lines that can allow aerodynamic spillage. The hinge lines of the control surfaces 12–18 require a seal to prevent the aerodynamic spillage.

Figure 2:
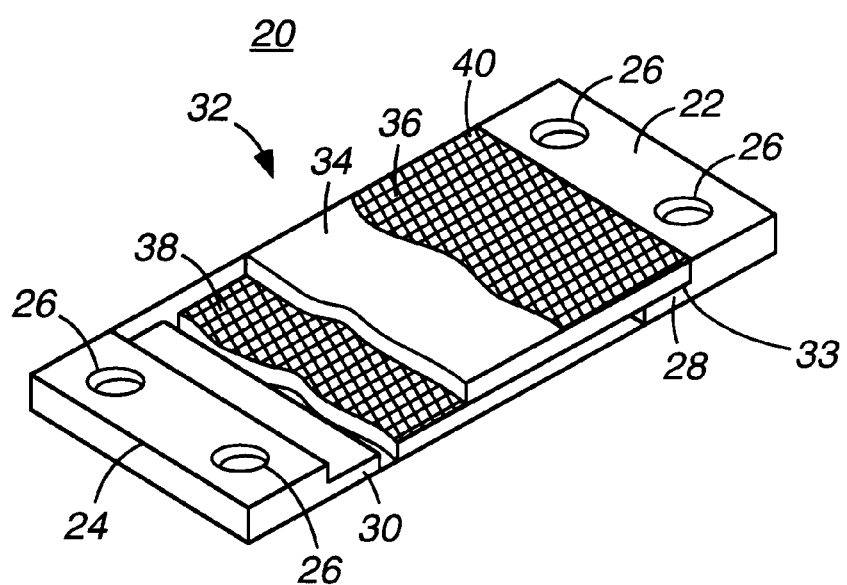
FIG. 2 is a perspective view of a cutaway drawing of a hinge line skin panel.

The key to providing such a seal is a hinge line skin 20 shown in FIG. 2. The hinge line skin 20 has a rigid member (first rigid structural member) 22 and a second rigid member (second rigid structural member) 24 that are attached to opposite edges of a hinge line. Attachment provisions 26 such as counter sunk screw holes, are provided in the rigid member 22 and the second rigid member 24. The rigid member 22 has a shear bonding area (flange, shear joint) 28. Similarly, the second rigid member 24 has a second shear bonding area (second flange) 30. An elastic panel 32 has a first end 33 that is bonded to the shear bonding area 28 of the rigid member 22. A second end is bonded to the second shear bonding area 30. The shear bonding area 28, 30 of the rigid members 22, 24 enhances the strength of the bond between the rigid member 22, 24 and the elastic panel 32. This results from the fact that adhesives have higher shear strength than lateral (perpendicular to the plane of the adhesive) strength.

The elastic panel 32 in one embodiment is an elastomeric material such as silicone. In another embodiment, the elastic panel 32 comprises an elastomer skin 34 with a stretchable knit fabric 36 bonded to a top surface of the elastomer skin 34. A second stretchable knit fabric (second knit fabric) 38 is bonded to a bottom surface of the elastomer skin 34. In one embodiment, the stretchable knit fabric 36, 38 has a plurality of SPANDEX® fibers. In another embodiment, the stretchable knit fabric 36, 38 is coated with an electrically conductive material (conductive material), such as a metal. The addition of the electrically conductive material provides an electromagnetic interference (EMI) shield. EMI shielding can protect electronic instruments contained in the wings or other aircraft parts to which the control surface is attached.

In yet another embodiment, an environmental coating 40 is placed over the stretchable knit fabric (knit fabric) 36, 38. The environmental coating in one embodiment is an elastomeric coating that can be made from fluorosilicones, fluoroelastomers, silicones, thermoplastic elastomers, urethanes or other viable elastic materials. The environmental coating 40 protects the elastomer skin 34 from jet fuel, oil and other solvents.

Figure 3:
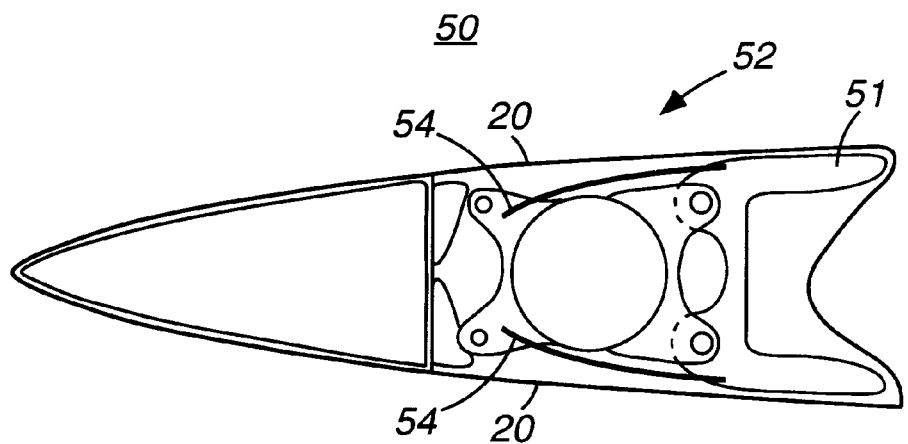
FIG. 3 is a cross sectional view of an aircraft control surface having a hinge line skin system.
Figure 4:
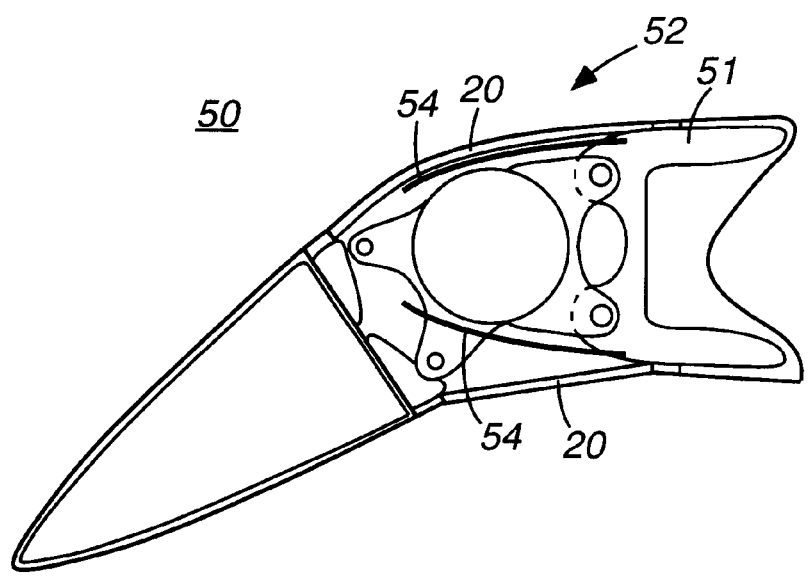
FIG. 4 is a cross sectional view of the aircraft control surface of FIG. 3 in a tilted position.

FIG. 3 shows a cross section of a control surface 50 pivotally attached to a structural member 51 of an aircraft. A hinge line system (hinge line sock system) 52 is used to cover gaps resulting along the hinge line. The hinge line system 52 includes the hinge line skin 20. The hinge line skin 20 is attached so that in the position shown in FIG. 3 the elastic panel 32 is in an extended state. One method of accomplishing this is to pivot the control surface 50 beyond its standard operating range when installing the elastic panel 32 (as shown in FIG. 4). As a result the elastic panel 32 will be in the extended state (applied tension) through out the operating range (majority of a range of motion) of the control surface 50. By stretching the elastic panel 32 it has lateral stability to pressure variations. Since the elastic panel 32 is extended (an extended position) throughout the operating range (normal range of motion), it will have lateral stability throughout the operating range of the control surface 50.

A pair of sills (support sill) 54 is provided under the hinge line skin (adjacent to a surface of the elastic sheet) 20. The sill 54 provides support for and shape the elastic panel 32 when the control surface 50 is pivoted. The ends of the sills 54 are curved to provide a smooth curvilinear shape to the elastic panel 32.

Thus there has been described a hinge line system for an aircraft that prevents aerodynamic spillage and is light weight. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A hinge line sock system for an aircraft, comprising:
   a first stretchable knit fabric;
   a uniform elastomer skin having a top surface bonded to the stretchable knit fabric;
   a second stretchable knit fabric bonded to a bottom surface of the elastomer skin;
   a first rigid structural member attached to a first end of the elastomer skin, the first rigid structural member attached to a control surface of the aircraft and having a shear bonding area; and a second rigid structural member attached to a first end of the elastomer skin, attached to a structural member of the aircraft.

2. The hinge line sock system of claim 1, further including an environmental coating covering the first stretchable knit fabric.

3. The hinge line sock system of claim 1, further including a sill attached to the structural member of the aircraft and adjacent to the second stretchable knit fabric the sill supporting the second stretchable knit fabric when the control surface is pivoted.

4. The hinge line sock system of claim 1, wherein the first stretchable knit fabric has a plurality of elastic fibers.

5. The hinge line sock system of claim 1, wherein the first stretchable knit fabric is coated with an electrically conductive material.

6. The hinge line sock system of claim 5, wherein the elastomer skin is in an extended state throughout a majority of a range of motion of the hinge line.

7. A hinge line system for an aircraft comprising:
   a structural block attached to a control surface of the aircraft, the structural block having a flange;
   a first stretchable knit fabric;
   an elastic sheet having a first end attached to the flange of the structural block, the elastic sheet having a top surface bonded to the stretchable knit fabric;
   a second stretchable knit fabric bonded to a bottom surface of the elastic sheet; and
   a second structural block attached to a structural member of the aircraft, the second structural block having a second flange attached to a second end of the elastic sheet.

8. The hinge line system of claim 7, further including a support sill connected to the first edge of the hinge line and adjacent to a surface of the elastic sheet.

9. The hinge line system of claim 8, further including an environmental coating covering the first stretchable knit fabric.

10. The hinge line system of claim 8, wherein the first stretchable knit fabric is coated with a conductive material.

11. The hinge line system of claim 8, wherein the first stretchable knit fabric has a plurality of elastic fibers.

12. The hinge line system of claim 7, wherein the elastic sheet is in an extended position throughout an operating range of motion of the control surface.

13. A hinge line skin for an aircraft, comprising:
   a first rigid member attached to a control surface of the aircraft, the rigid member having a shear bonding area;
   a stretchable knit fabric;
   an elastic panel having a first end bonded to the shear bonding area, the elastic panel having a top surface bonded to the stretchable knit fabric;
   a second stretchable knit fabric bonded to a bottom surface of the elastomer sheet; and
   a second rigid member attached to a structural member of the aircraft, the second rigid member having a second shear bonding area bonded to a second end of the elastic panel.

14. The hinge line skin of claim 13, further including a support sill attached to the structural member.

15. The hinge line skin of claims 13, wherein the elastic panel has an applied tension.

* * * * *